US012744481B2

(12) United States Patent
Ghassani et al.

(10) Patent No.: US 12,744,481 B2
(45) Date of Patent: Sep. 22, 2026

(54) DETERMINING A PERMANENT MAGNET FLUX STATE

(71) Applicant: Schneider Toshiba Inverter Europe SAS, Pacy sur Eure (FR)

(72) Inventors: Rashad Ghassani, Toulouse (FR); Mohamad Koteich, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 259 days.

(21) Appl. No.: 18/242,039

(22) Filed: Sep. 5, 2023

(65) Prior Publication Data

US 2024/0120864 A1 Apr. 11, 2024

(30) Foreign Application Priority Data

Sep. 29, 2022 (EP) .................................... 22306448

(51) Int. Cl.
*H02P 21/14* (2016.01)

(52) U.S. Cl.
CPC ........ *H02P 21/141* (2013.01); *H02P 2207/05* (2013.01)

(58) Field of Classification Search
CPC ........ H02P 21/22; H02P 21/141; H02P 21/18; H02P 2207/05; H02P 21/14; H02P 23/14; H02P 29/662; H02P 21/06; H02P 27/08; H02P 21/0089; H02P 21/20; H02P 21/13; H02P 2203/11; H02P 21/10; H02P 21/26; H02P 21/0003; H02P 21/24; H02P 21/16; H02P 21/34; H02P 6/183; H02P 25/022; H02P 27/12
See application file for complete search history.

(56) References Cited

U.S. PATENT DOCUMENTS

| | | | | |
|---|---|---|---|---|
| 11,239,772 | B1 | 2/2022 | Bojoi et al. | |
| 2013/0249448 | A1* | 9/2013 | Kobayashi | H02P 21/141 318/400.02 |
| 2017/0250628 | A1* | 8/2017 | Tian | H02P 21/14 |
| 2020/0343841 | A1* | 10/2020 | Rotilli Filho | H02P 6/183 |

(Continued)

OTHER PUBLICATIONS

Aljehaimi, Akrem Mohamed et al., "Online Rotor Flux Linkage Estimation for a Variable Flux Interior Permanent Magnet Syncronous Machine Operating at Different Flux Density Levels", 2016 IEEE International Conference on Power Electronics, Drives and Energy Systems (PEDES), Dec. 14, 2016, 6 pages.

(Continued)

*Primary Examiner* — Kawing Chan
*Assistant Examiner* — Charles S Laughlin
(74) *Attorney, Agent, or Firm* — Wolf, Greenfield & Sacks, P.C.

(57) ABSTRACT

Examples include a method for determining a permanent magnet flux state of a rotor in a synchronous motor using a VSD. The method includes obtaining d-axis and q-axis inductance values of the motor, fixing a non-zero stator current magnitude and controlling a motor speed using a speed loop regulation in a stator current angle γ polar coordinate frame to reach a zero motor speed steady state corresponding to the fixed non-zero stator current magnitude, to the obtained d-axis and q-axis inductance values, and to a no-load situation. The method further includes recording coordinates of the reached steady state.

20 Claims, 4 Drawing Sheets

(56) References Cited

U.S. PATENT DOCUMENTS

2022/0038040 A1* 2/2022 Inomata .................. H02P 27/08
2022/0077801 A1 3/2022 Jebai et al.

OTHER PUBLICATIONS

Nair, Sandeep V. et al., "Quick and seamless transition method for I-f to sensorless vector control changeover and on-the-fly start of PMSM drives", IET Electric Power Applications, vol. 14, Issue 11, Nov. 2020, pp. 2231-2242.
European Search Report and Search Opinion dated Mar. 10, 2023 for corresponding European Patent Application No. EP22306448.6, 10 pages.

* cited by examiner

100

101
d-axis and q-axis inductance values
102
non-zero stator current magnitude
103
speed loop regulation in γ frame
104
recording coordinates
200

101
d-axis and q-axis inductance values
102
non-zero stator current magnitude
103
speed loop regulation in γ frame
104
recording coordinates
205
operating motor
206
detect difference
207
Limiting load and/or speed

300

101
d-axis and q-axis inductance values
102
non-zero stator current magnitude
103
speed loop regulation in γ frame
104
recording coordinates
308
receive sensor data

400

101
d-axis and q-axis inductance values
102
non-zero stator current magnitude
103
speed loop regulation in γ frame
104
recording coordinates
409
transmit state information

DETERMINING A PERMANENT MAGNET FLUX STATE

FIELD OF THE INVENTION

This invention relates to a determining a permanent magnet flux state of a rotor in a synchronous motor using a variable speed drive, and to a computer-readable storage medium, variable speed drive and server implementing said method.

BACKGROUND

In a conventional variable speed drive of a synchronous electrical motor comprising a permanent magnet, in particular a permanent magnet comprised in a rotor of the synchronous motor to produce a magnetic flux, a control law is executed by a processing unit and receives an input reference. As a function of such input reference and of measurements of values on the motor, the processing unit determines a voltage reference to be applied to the electrical motor. From this voltage reference, the processing unit determines the control voltages to be applied to each output phase connected to the motor. These voltages are applied to the motor using an electronic power architecture.

As a general rule, the control law takes the magnetic flux of the permanent magnet into account. Such magnetic flux may evolve over time, for a variety of reasons, for example due to an exposure of rotor permanent magnets to demagnetizing fields, to excessive temperatures, or to the motor driving an excessive load. This evolution may impact motor performance, motor health or motor lifetime.

The aim of the invention is to propose a method for determining the state of a permanent magnet rotor in a synchronous motor using a variable speed drive, the method permitting avoiding or mitigating issues introduced by an evolution of the magnetic flux over time.

SUMMARY

The invention is defined by the appended independent claims. Additional features and advantages of the concepts herein disclosed are set forth in the description which follows.

The present disclosure describes a method for determining a permanent magnet flux state of a rotor in a synchronous motor using a variable speed drive (VSD) the method comprising:

- obtaining, at the VSD, d-axis and q-axis inductance values of the motor;
- fixing, by the VSD, a non-zero stator current magnitude;
- controlling, by the VSD, a motor speed using a speed loop regulation in a stator current angle, $\gamma$, polar coordinate frame to reach a zero motor speed steady state corresponding to the fixed non-zero stator current magnitude, to the obtained d-axis and q-axis inductance values, and to a no-load situation; and
- recording, at the VSD, coordinates of the reached steady state.

Such a method permits detecting the permanent magnet flux state at motor standstill in a no-load situation.

In some cases, the coordinates correspond to $\gamma=0°$, whereby the method comprises communicating, by the VSD, that the flux state corresponds to a low saliency state. Determining low saliency in such conditions avoids a risk of reaching excessive stator currents in seeking to obtain a permanent magnet flux value estimate.

In some cases, the coordinates correspond to $\gamma=90°$, whereby the method comprises communicating, by the VSD, that the flux state corresponds either to a demagnetized or to a zero flux state. This situation would indeed correspond to the behavior of a synchronous reluctance motor.

In some cases, the coordinates correspond to a value of $\gamma$ comprised in an interval of $[-180°; -90°[\cup]-90°; 0°[\cup]0°; 90°[\cup]90°; 180°]$, whereby the method comprises communicating, by the VSD, a permanent magnet flux value estimate. This situation indeed corresponds to a salient-pole permanent-magnet synchronous motor configuration.

Optionally, the method comprises operating such motor with the VSD taking the permanent magnet flux value estimate into account. This permits increasing precision in operating the motor by using an updated flux value.

Optionally, the method comprises detecting, at the VSD, a difference between the permanent magnet flux value estimate and a reference value, whereby the difference is consistent with a rotor flux reduction exceeding a predetermined drift threshold, and, in response to the detecting, limiting, by the VSD, one or more of a motor speed or motor load in order to reduce an operating temperature. This permits avoiding or reducing further deterioration.

In some examples, the method comprises receiving, at the VSD, motor position sensor data from one or more sensors, the one or more sensors comprising one or more of a hall sensor and of an optical encoder sensor. Relying on sensor data permits obtaining a satisfactory precision in operating the speed loop regulation without having to rely on a sensorless operation.

In some examples, the method comprises transmitting, by the VSD, permanent magnet flux state information over a network. Such sending permits transmitting the measures to a remote location.

The present disclosure also describes a non-transitory computer-readable storage medium comprising instructions which, when executed by a processor, cause the processor to carry out any of the methods hereby described. Such processor may for example be a processor of a variable speed drive of the synchronous motor comprising a permanent magnet rotor.

The present disclosure also describes a variable speed drive of a synchronous motor comprising a permanent magnet rotor, the variable speed drive comprising a processor and a memory, the processor being configured to operate according to any of the methods hereby described. Such variable speed drive may thereby operate or control the motor with increased reliability.

In some examples, the VSD is configured to operate the synchronous motor in a standstill mode. The example methods are particularly suited to such a standstill mode, considering that the speed loop regulation is to reach a zero motor speed. More specifically, the VSD may be configured to operate the motor decoupled from a load.

In some examples, the VSD comprises a networking module to communicate a permanent magnet flux state in function of the recorded coordinates of the reached steady state. Such module is particularly suited to operating in a networked or remote context. More specifically, the nature of communication of the permanent magnet flux state may be in function of the value of the stator current angle, $\gamma$, polar coordinate frame corresponding to the reached steady state, permitting communicating that the flux state corresponds to a low saliency state, that the flux state corresponds either to a demagnetized or to a zero flux state, or permitting communicating a permanent magnet flux value estimate.

The present disclosure also describes a server comprising a processor, a networking module and a memory, whereby the server is connected via a network to a plurality of variable speed drives configured to transmit permanent magnet flux state information over a network. Such centralized collection of information permits running a statistical analysis and detecting potential issues affecting one or more types of motors or motor fleets.

DETAILED DESCRIPTION

Figures 1, 2:
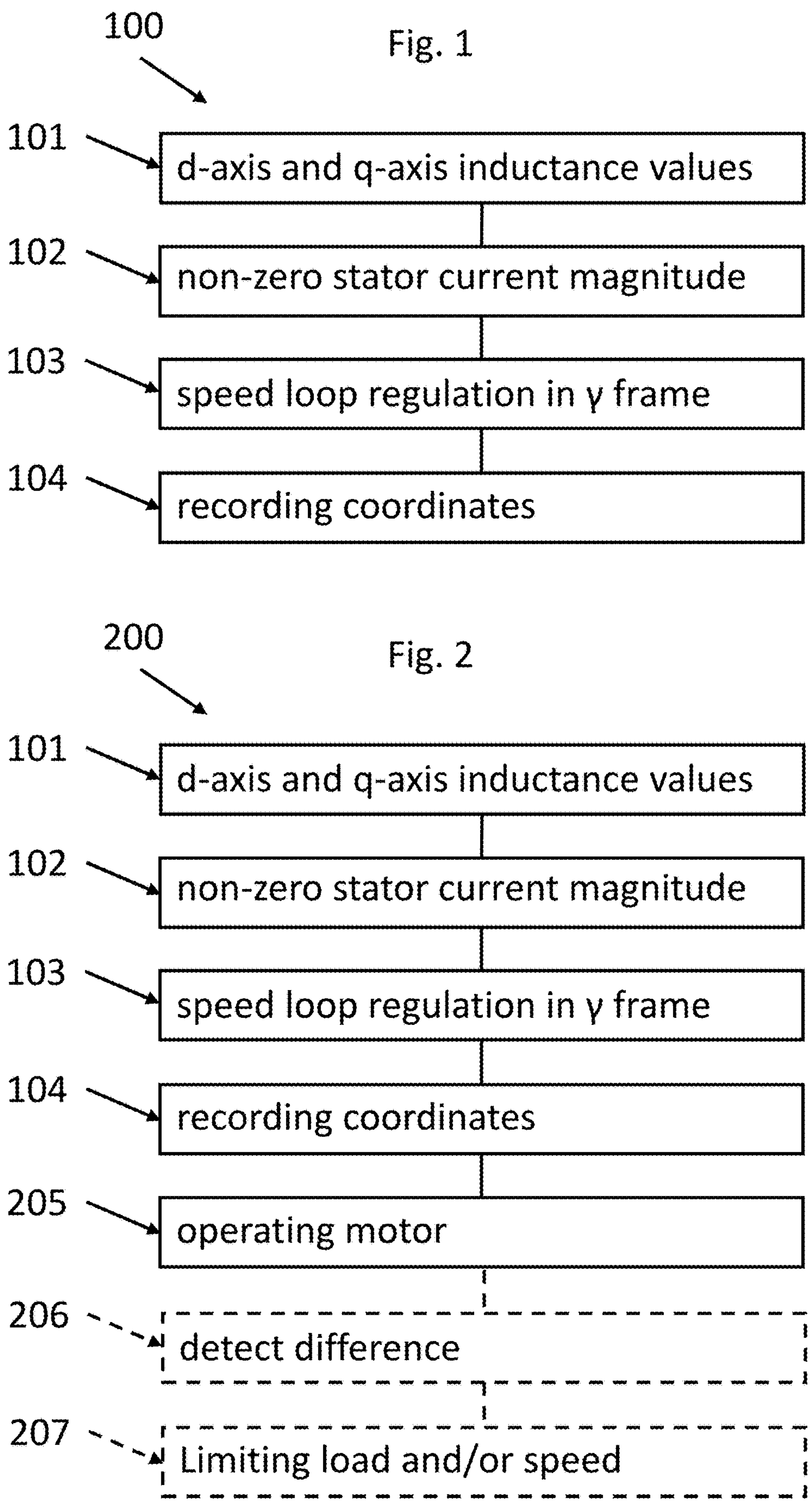
FIG. 1 illustrates an example method.
FIG. 2 illustrates another example method.

This disclosure applies to a synchronous motor using a variable speed drive. A variable speed drive should be understood in this disclosure as an electronic, virtual or software implemented control unit for an electric motor. In some examples, a variable speed drive comprises a processing and control unit intended to implement a control law by taking into account, for example, an input speed set point, voltages to be applied to the electric motor during normal operation of the motor and control instructions to be applied to an inverter stage in order to obtain these output voltages. The control law may be of a vector or a scalar type. The variable speed drive may comprise a rectifier stage at an input, such rectifier stage being intended to convert an alternating voltage supplied by an electric network into a direct voltage. The variable speed drive may also comprise a direct power bus connected, on the one hand, to the rectifier stage and, on the other hand, to an inverter stage. The direct power bus can comprise two power lines connected together by at least one bus capacitor configured to stabilize the voltage of the bus. The rectifier may be of a passive type such as a diode bridge or an active type based on controlled transistors. The inverter stage may be connected at the output of the direct power bus and intended to cut off the voltage supplied by the bus at a variable voltage to the electric motor; the inverter stage comprising for example multiple switching arms each comprising controlled power transistors, for example of the IGBT (Insulated Gate Bipolar Transistor) type, for applying the variable voltage to the electric motor. The inverter may be controlled by, for example, a conventional technique using a PWM (Pulse Width Modulation), for example of the Vector Control type. The control law performed by the processing unit UC makes it possible to determine the voltage to be applied to the output phases intended to be connected to the motor to be controlled.

According to this disclosure, a synchronous motor is controlled by, or using, the variable speed drive. A synchronous motor should be understood as an alternating-current (AC) electric motor designed to run at a speed which varies with the frequency of a power source applied to a stator of the motor. Starting a synchronous motor may be challenging and a synchronous motor starting procedure may be implemented in a control law applied by the variable speed drive of the synchronous motor to start. In the synchronous motors according to this disclosure, the motor speed or position is maintained or obtained by a permanent magnet rotor of the motor which will tend to revolve at the same speed as a magnetic field generated by the power source applied to stator windings, or tend to maintain a specific position by applying a torque corresponding to such magnetic field generated by the power source applied to stator windings. In other words, in a stable state of operation, the rotor rotates at the same speed as a revolving field generated by the stator or maintains a specific position. In some examples, the stator comprises a cylindrical frame with windings, such as three-phase windings, located in slots of the stator. During stable operation, as a mechanical load is applied, the rotor slips back a number of degrees with respect to a rotating field of the stator, developing torque and continuing to be drawn around by this rotating field. The angle between a magnetic field of the rotor and a magnetic field of the stator normally increases as load increases. According to this disclosure, the magnetic field for the rotor of the synchronous motor is provided by using one or more permanent magnets, whereby the motor comprises a permanent magnet rotor generating a magnetic flux. The rotor may also comprise one or more windings in addition to the one or more permanent magnets, such as a damper winding for example. The use of permanent magnets may eliminate or reduce the use of slip rings and of an external power source dedicated to generating a rotor magnetic field. While a magnetic flux value generated by windings may be evaluated as a function of the power applied to the windings, the magnetic flux value produced by one or more permanent magnets is a function of each permanent magnet, and may in principle not be evaluated in a simple manner. Such magnetic flux value should however be taken into account as a factor in a control law aimed at driving the motor. In some cases, such magnetic flux value is provided by a manufacturer of the motor, for example on a visible plaque displaying motor characteristics or on a motor data sheet. A user of the motor may then use such manufacturer provided magnetic flux value as a factor of the control law used to operate the motor. The magnetic flux value may also evolve over time, the material of the permanent magnet being submitted to external influences such as temperature and external magnetic field which may impact an original magnetic flux value and modify it. Such inaccuracies have a negative impact on controlling the motor. The methods hereby described reduce or prevent such negative impact.

As will be explained below, example methods rely on applying a speed loop regulation to reach a zero speed to determine a permanent magnet flux state of the rotor. This permits acquiring information as to such permanent magnet flux state in situations where the motor is at standstill, i.e. tending to maintain a given angular position. In addition to permitting evaluating permanent magnet flux state at standstill, such evaluation or determination is provided at a fixed, determined non-zero stator current magnitude, avoiding operating other types of regulations which may result in reaching excessive stator current magnitude values, for example in cases of low saliency. Such methods also permits avoiding or reducing motor operation in a high-frequency mode. Such methods rely on fundamentals of motor control theory, such theory describing relationships, at any point in time, between stator currents, stator resistance, stator phase inductance and rotor magnetic flux. The methods permits, at a certain point in time, ascertaining rotor permanent magnet flux state, in a reproduceable manner.

FIG. 1 illustrates an example method 100 for determining a permanent magnet flux state of a rotor in a synchronous motor using a variable speed drive according to this disclosure. Such a motor should be understood as a permanent magnet synchronous motor (PMSM).

As illustrated in bloc 101, method 100 comprises obtaining, at the VSD, d-axis and q-axis inductance values of the motor. The d-axis inductance value, $L_d$, and the q-axis inductance value, $L_q$, may be obtained for example from motor specifications or by signal injection techniques which will not be described here. Inductance value La may be defined as $L_\Delta=L_d-L_q$, whereby $L_\Delta$ corresponds to a non-salient motor when equal or close to zero. The d-axis and q-axis should be understood respectively as the direct axis and quadrature axis of the stator of the motor. In this representation, a direct axis current is used to control the rotor magnetizing flux, while a corresponding quadrature axis current corresponds to a motor torque. Real currents may be applied to stator windings to reach a desired specific direct and/or quadrature axis stator current value.

As illustrated in block 102, method 100 comprises fixing, by the VSD, a non-zero stator current magnitude $I_S$. As will be explained in more details below, using such a non-zero value for $I_S$ will permits in some examples estimating a permanent magnet flux value $\phi_r$ from the following magnetic torque expression (keeping in mind that other equations may be used to represent relationships between such physical values, for example using other conventions or representations):

$$T_{em}=\frac{3}{2}n_p(\phi_r-L_\Delta I_s\sin\gamma)I_s\cos\gamma$$

whereby:

$T_{em}$ is the electromagnetic magnetic torque;

$n_p$ is a number of pole pairs of the motor; and $\gamma$ is a stator current angle in a polar coordinate frame as will be explained in more details below.

In some examples, the fixed non-zero stator current magnitude $I_S$·is of less than twice a nominal stator current magnitude. In some examples, the fixed non-zero stator current magnitude $I_S$·is of less than 150% of a nominal stator current magnitude. In some examples, the fixed non-zero stator current magnitude $I_S$·is of less than 100% of a nominal stator current magnitude. Limiting the fixed non-zero stator current magnitude $I_S$·permits avoiding damaging the motor.

As illustrated in block 103, method 100 comprises controlling, by the VSD, a motor speed using a speed loop regulation in a stator current angle, $\gamma$, polar coordinate frame to reach a zero motor speed steady state corresponding to the fixed non-zero stator current magnitude, to the obtained d-axis and q-axis inductance values, and to a no-load situation. It should be understood that such controlling takes place while maintaining the fixed non-zero stator current magnitude $I_S$.

Stator current angle $\gamma$ should be understood as $\gamma$=atan2($-i_d$, $i_q$), where atan2 is the 2-argument arctangent function returning the argument, phase or angle of the complex number $-i_d+ji_q$ (where $j^2=-1$) where $i_d$ and $i_q$ are, respectively, the direct axis stator current value and the quadrature axis stator current value. In other words $i_d=-I_S\sin(\gamma)$ and $i_q=I_S\cos(\gamma)$. The direct axis stator current value should be understood as the current value along the direct axis in a direct axis/quadrature axis of the stator of the motor. In such a direct axis/quadrature axis representation, the direct axis current is used to control the rotor magnetizing flux, while a corresponding quadrature axis stator current corresponds to the motor torque, as mentioned above in the context of the corresponding inductance values.

The speed loop regulation uses $\gamma$, also named current angle $\gamma$, as control variable. An example speed control loop is described in FIG. 7 in more details below.

One should note that the regulation according to block 103 takes place in a no-load situation. A no-load situation should be understood as a situation in which the load is negligeable, for example of less than 0.5% of a nominal load. In such a situation, the term $T_{em}$ may be assumed as being negligeable. In some examples, the motor is considered as in a no-load situation when decoupled from a load. One should note that decoupling, in particular mechanically decoupling, a motor from a load will not suppress a minor load introduced for example by bearings of the motor itself, in other words, and as mentioned above, a "no-load" situation is not strictly speaking a zero load situation. In some examples, a no-load situation corresponds to a situation whereby no static load is applied to the motor. In some examples, a no-load situation as per the present disclosure corresponds to an "end-of-line" situation, whereby the motor is assessed, using an example method according to this disclosure, at the end of a motor manufacturing line in order to determine the permanent magnet flux state of its rotor prior to releasing the motor for operation. In some examples, a level of "no-load" is dependent on a desired precision as to determination of permanent magnet flux state of the rotor, whereby a higher precision may be obtained in a no-load situation whereby $T_{em}$ is of less than 0.1% of a nominal load compared to a no-load situation whereby $T_{em}$ is of less than 0.2% of the nominal load. Example methods may indeed comprise setting a threshold magnetic torque value, whereby a situation is considered as no-load if the magnetic torque is of less than the threshold. In some examples, such threshold magnetic torque value is of 1% of a nominal magnetic torque, of 0.5% of a nominal magnetic torque, of 0.2% of a nominal magnetic torque or of 0.1% of a nominal magnetic torque.

As illustrated in block 104, method 100 comprises recording, at the VSD, coordinates of the reached steady state. Such coordinates may be recorded in different manners, for example by recording a reached $\gamma$ value, or recording reached $i_d$ and $i_q$ values. Such recording may take place for example in a VSD memory or in a memory of a server connected to the VSD.

In some examples, the coordinates correspond to $\gamma=0°$, whereby the method comprises communicating, by the VSD, that the flux state corresponds to a low saliency state. In such a situation, the motor is not sufficiently salient to reach a steady state permitting determining a permanent magnet flux value estimate. In such a situation, the permanent magnet flux state is considered as a low saliency state. It should be understood that imprecisions may be taken into account, and that $\gamma=0°$ should be understood for example as $-1°<\gamma<1°$ or as $-2°<\gamma<2°$.

In some examples, the coordinates correspond to $\gamma=90°$, whereby the method comprises communicating, by the VSD, that the flux state corresponds either to a demagnetized or to a zero flux state. Such a situation may also permit determining a permanent magnet flux value estimate of zero. It should be understood that imprecisions may be taken into account, and that $\gamma=900$ should be understood for example as $\gamma>89°$ or as $\gamma>88°$.

In some examples, the coordinates correspond to a value of $\gamma$ comprised in an interval of [−90°; 0°[ or to a value of $\gamma$ comprised in an interval of [0°; 90°[, or in an interval of [90°; 180°], or in an interval of [−180°; −90°] whereby the method comprises communicating, by the VSD, a permanent magnet flux value estimate. Such situation indeed correspond to a sufficient saliency (compared to $\gamma=0°$) and to the existence of permanent magnet flux (compared to $\gamma=90°$). In such situations, the permanent magnet flux value estimate may be extracted from the magnetic torque expression mentioned above. In some examples, the permanent magnet flux value estimate is in the form of a rotor flux parameter which, while it may correspond to the rotor flux itself, may be representative of the rotor flux without being the rotor flux itself. The rotor flux parameter may for example be in Weber or may for example be unitless.

Extracting the permanent magnet flux value estimate from the magnetic torque expression mentioned above may for example result from resolving the equation $\phi_r=L_\Delta I_S \sin\gamma$, whereby the value of $\gamma$ is comprised in an interval of $[-180°; -90°]\cup[-90°; 0°]\cup[0°; 90°]\cup[90°; 180°]$and $T_{em}$, is considered negligeable at no-load (again, keeping in mind that other equations may be used to represent relationships between such physical values, for example using other conventions or representations).

FIG. 2 illustrates another example method 200 according to this disclosure. Example method 200 comprises blocks 101-104 as described in the context of example method 100. Example method 200 further comprises block 205 of operating the motor with the VSD taking the permanent magnet flux value estimate into account. This permit operating the motor using a control law which is a closer reflection of real motor characteristics, leading to a more precise operation.

While example method 200 may be limited to operating blocks 101-104 and 205, in some cases example method 200 further comprises block 206 of detecting, at the VSD, a difference between the permanent magnet flux value estimate and a reference value, whereby the difference is consistent with a rotor flux reduction exceeding a predetermined drift threshold, example method 200 further comprising block 207 of, in response to the detecting according to block 206, limiting, by the VSD, one or more of a motor speed or motor load in order to reduce an operating temperature. Such a mode of operation permits adapting the motor operation to a motor health, avoiding or reducing the possibility of faulty operations or motor damage.

A predetermined drift threshold should be understood as a threshold representing a drift in rotor flux $\phi_r$. A drift should be understood as corresponding to a minor variation or deterioration in rotor flux, such as a variation of less than 25%, of less than 20%, of less than 15% or of less than 10%. The threshold still should correspond to detecting some variation, for example a variation of more than 0.5%, of more than 1%, of more than 2%, of more than 3%, of more than 4% or of more than 5%. The threshold may be defined relative to a reference value, for example a nominal magnetic flux value, for example a value determined at the end of a motor manufacturing line, for example a value determined by an example method at an earlier point in time, or may be defined in an absolute manner.

Limiting one or more of a motor speed or motor load in order to reduce an operating temperature is aimed at reducing or avoiding further drift or further deterioration of the flux. In some examples, both motor speed and load are limited. In some examples the limitation is as a percent of a nominal value. In some examples, the limitation corresponds to 120%, to 100%, to 90% or to 80% of a nominal value of the motor speed or motor load. In some examples, the detection of a relatively large difference between the first and the second rotor flux parameters corresponds to a more stringent limitation of speed or load. Such limitations aim at protecting the motor over time.

Figure 3:
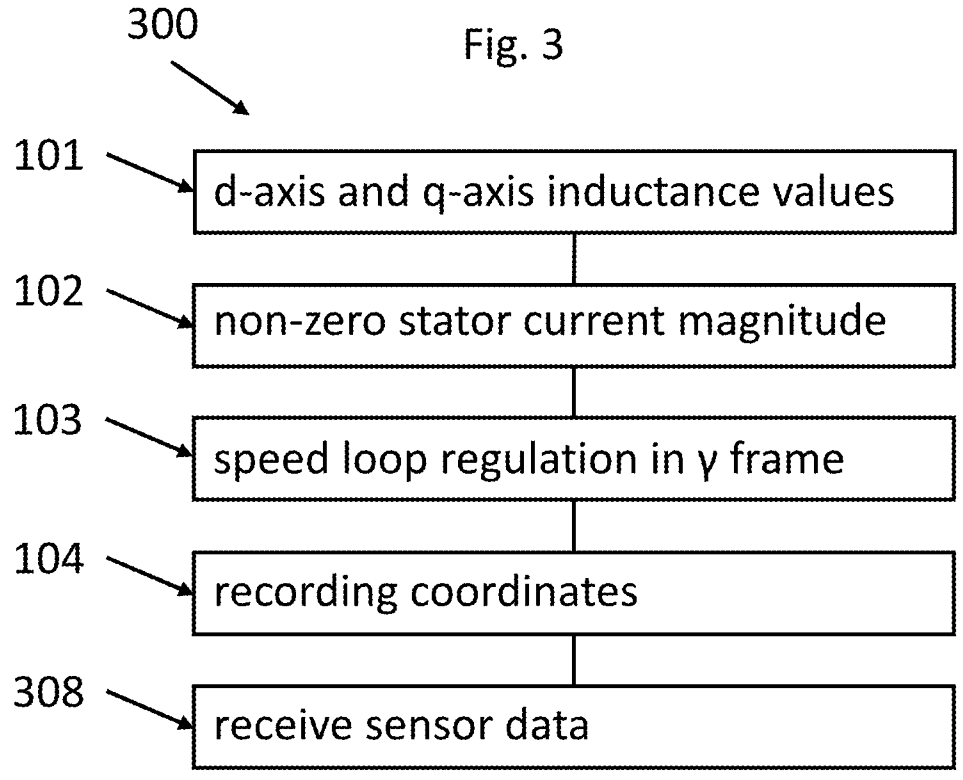
FIG. 3 illustrates a further example method.

FIG. 3 illustrates another example method 300 according to this disclosure. Example method 300 comprises blocks 101-104 as described in the context of example method 100. While not represented here, example method 300 may be combined with block 205 or with blocks 205, 206 and 207. Example method 300 further comprises block 308 of receiving, at the VSD, motor position sensor data from one or more sensors, the one or more sensors comprising one or more of a hall sensor and of an optical encoder sensor. While an example motor may be operated in a sensorless mode, operating the motor relying on sensor data can improve accuracy in determining the permanent magnet flux state of the rotor. In some examples, the motor position data corresponds to a rotor position provided by an optical encoder reading, the encoder being coupled with the rotor, or by readings from, for example, hall sensors disposed around the rotor, for example three hall sensors disposed around the rotor, whereby adjacent hall sensors are separated from each other by an angle of 120 degrees.

Figure 4:
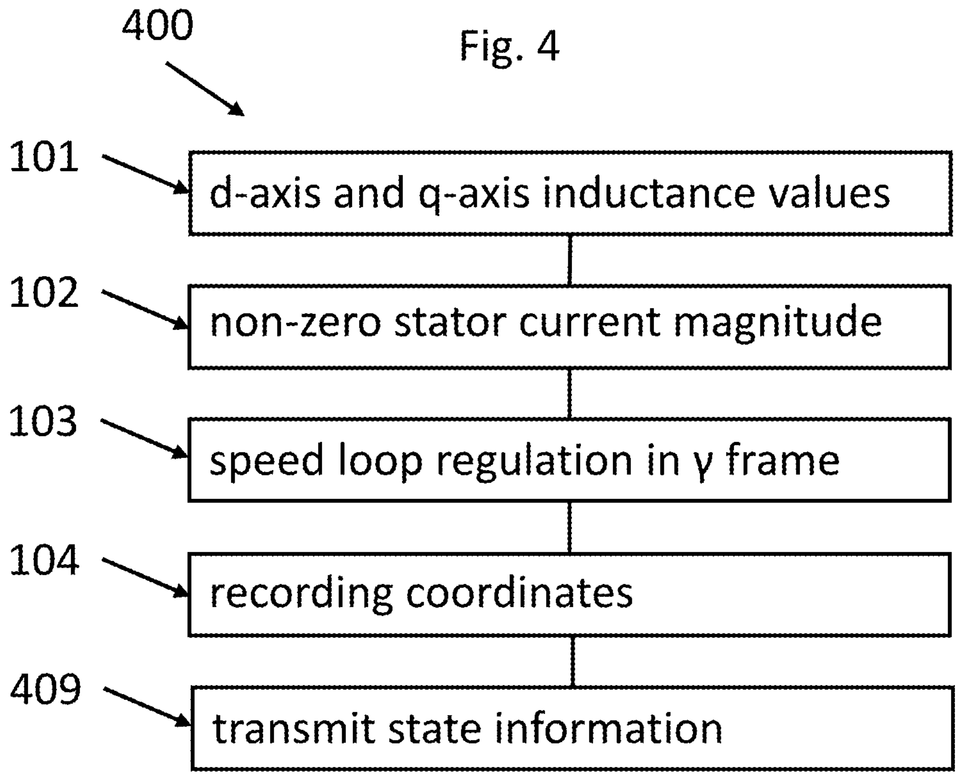
FIG. 4 illustrates yet another example method.

FIG. 4 illustrates another example method 400 according to this disclosure. Example method 400 comprises blocks 101-104 as described in the context of example method 100. While not represented here, example method 400 may be combined with block 205, with blocks 205, 206 and 207, and/or with block 308. Example method 400 further comprises block 409 of transmitting, by the VSD, permanent magnet flux state information over a network. Such sending or transmitting may for example take place via a networking module of the variable speed drive. Such sending can permit collecting data in order to monitor motor health remotely. Such sending may be wireless or by wire, or may be a combination of both. Indeed, in some examples, the VSD comprises a networking module to communicate a permanent magnet flux state in function of the recorded coordinates of the reached steady state. In some examples whereby the VSD comprises a networking module to communicate a permanent magnet flux state in function of the recorded coordinates of the reached steady state, the communication of the permanent magnet flux state is in function of the value of the stator current angle, $\gamma$, polar coordinate frame corresponding to the reached steady state, for example in function of a situation corresponding to one of $\gamma=0°$, $\gamma=90°$ or $\gamma\in]-180°; -90°[\cup]-90°; 0°[\cup]0°; 90°[\cup]90°; 180°]$.

In some examples, operating using block 409 can permit providing a demagnetization alert. Such demagnetization alert may be aimed at a user, an operator, or at a monitoring computing system. Such demagnetization alert may be displayed on a screen, for example a screen of the variable speed drive, or may be transmitted as an electromagnetic signal, for example via a communication network. A number of actions may be taken in response to the demagnetization alert, comprising one or more of the sending of a maintenance operator, the ordering of a replacement component such as a replacement permanent magnet, or the ordering of a replacement motor. The providing of such an alert may prevent or reduce operational downtime, or damage to an industrial system in which the motor may be included.

In some examples, example methods according to this disclosure comprise displaying the determined permanent magnet flux state. Such display, for example on a screen of the variable speed drive, can permit real time monitoring of the state by a user, permitting operating the motor in extreme conditions while avoiding or limiting permanent damage.

In order to avoid or reduce an impact of the example methods on productivity, any of the methods hereby described may be applied to a motor which is assigned a repetitive mission profile comprising no-load time intervals at standstill, whereby the example methods are operated at no-load at standstill during such time intervals. A repetitive mission profile should be understood as a repetitive operational activity, involving for example both a specific motor speed and specific motor load. In other examples, an example method according to this disclosure may be decoupled from the operational functioning of the motor. In some examples, the running of an example method according to this disclosure may be triggered by a user. In some examples, the VSD is configured to operate the synchronous motor in a standstill mode, whereby example methods hereby described may be integrated in such standstill mode.

In some examples, any of the methods hereby described comprise modifying a maintenance plan in function of the determined permanent magnet flux state. A maintenance plan may for example comprise one or more action items related to one or more of a motor component replacement, a maintenance visit by a maintenance operator or the running of a maintenance routine.

In some examples, example methods according to this disclosure further comprise recording an evolution of determined permanent magnet flux state over time. Such evolution record may be for example stored in a memory of the variable speed drive according to this disclosure. Such evolution record may also, or alternatively, be stored remotely. Such evolution record may be stored on a centralized data depository, such centralized data depository storing evolution records corresponding to a plurality of variable speed drives, thereby permitting comparing an evolution of such variable speed drives and corresponding electric motors. Such centralized data depository may be maintained by a manufacturer of the electric motor or of the variable speed drive in order to monitor the plurality of variable speed drives and electric motors, thereby permitting implementing preventive measures if a certain evolution is detected for a certain type of variable speed drive or electric motor.

Figure 5:
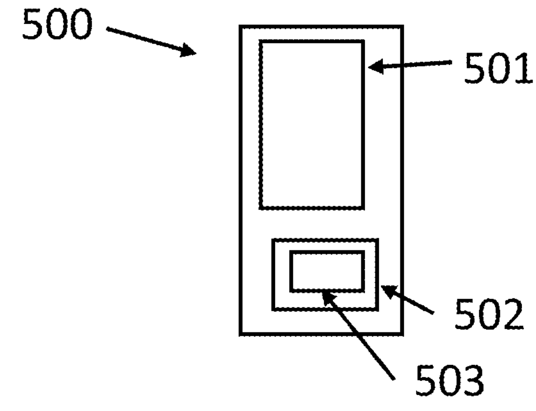
FIG. 5 illustrates an example variable speed drive.

FIG. 5 illustrates an example variable speed drive 500 comprising a processor 501, the processor 501 being configured to operate according to any of the example methods 100, 200, 300 or 400 hereby described. Processor 501 may comprise electronic circuits for computation managed by an operating system.

FIG. 5 also illustrates a non-transitory machine-readable or computer readable storage medium, such as, for example, memory or storage unit 502 of the variable speed drive, whereby the non-transitory machine-readable storage medium is encoded with instructions 503 executable by a processor such as processor 501, the machine-readable storage medium comprising instructions 503 to operate processor 501 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the example methods hereby described.

Figure 6:
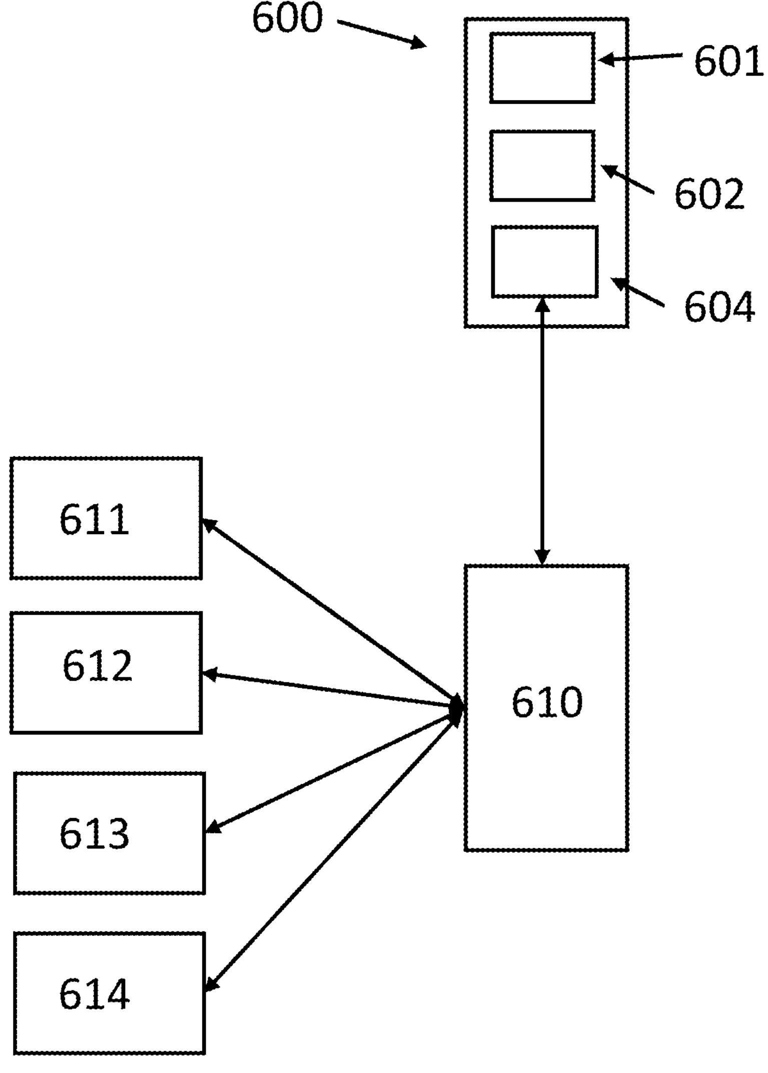
FIG. 6 illustrates another example variable speed drive and an example server.

FIG. 6 illustrates an example variable speed drive 600 comprising a processor 601 and a memory 602, the processor 601 being configured to operate according to any of the methods hereby described and comprising a block such as block 409. Processor 601 may comprise electronic circuits for computation managed by an operating system. Variable speed drive 600 further comprises a networking module 604. Networking module 604 permits transmitting data related to the rotor flux parameters according to this disclosure to a centralized data depository or server 610. Centralized depository 610 may in turn be connected via a network to a plurality of variable speed drives 611-614 according to this disclosure. Such centralized depository may compile permanent magnet flux state determined according to this disclosure in a memory of the centralized depository, the centralized depository processing such collected data using a processing unit or processor of the centralized depository in order to monitor the plurality of variable speed drive, and respective motors, connected or networked to the centralized depository.

In some examples, a server such as server 610 is to further receive, via the networking module 604 or via a plurality of networking modules from variable speed drives 600, 611-614, permanent magnet flux state data from the plurality of variable speed drives. Combining such data permits precisely monitoring flux over time for the plurality of variable speed drives and respective motors concerned. In some examples, the server further receives data identifying each motor, or each motor type. In some examples, the processor of the server is to modify a maintenance plan in function of the received measures of comparison. The maintenance plan may take the permanent magnet flux state data into account. Collecting such data may provide a magnetic flux state diagnostic for a plurality of motors, for example based on a deviation of the data from a predetermined range. Such providing of diagnostic may permit preventing or solving issues which otherwise would negatively impact the operation of the electric motor and/or of the variable speed drive. Life expectancy of an electric motor or variable speed drive may indeed be rendered longer by applying a method according to this disclosure.

Figure 7:
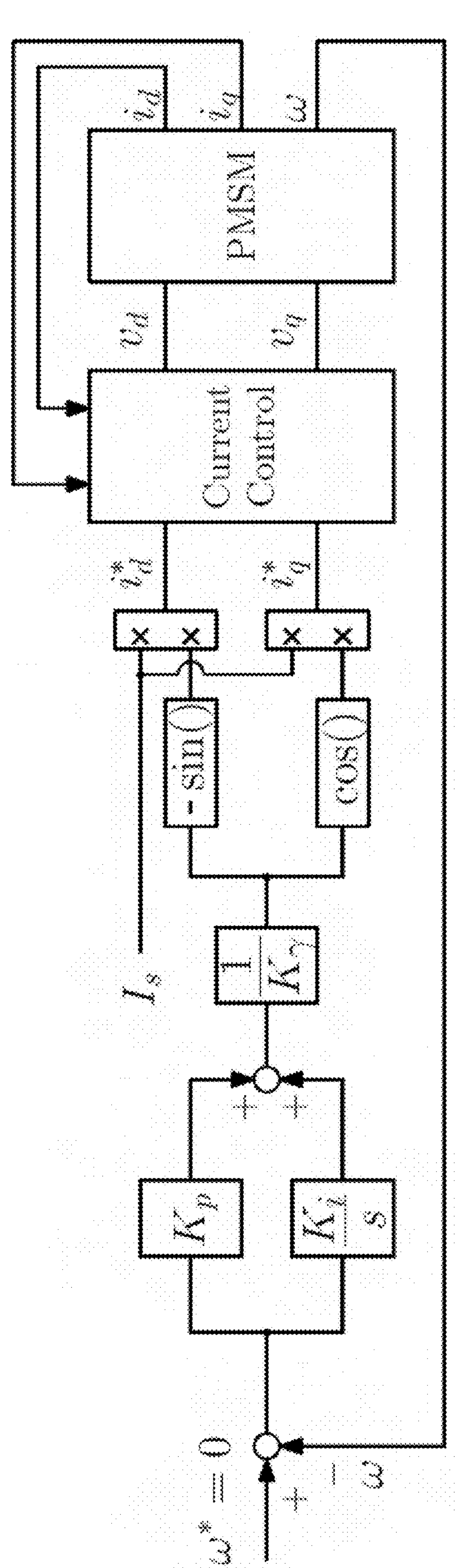
FIG. 7 illustrates an example control loop.

A specific example of speed loop regulation implementing an example method according to this disclosure is illustrated in FIG. 7. The speed loop, or control loop, is illustrated using the conventions used in the equations discussed above. The speed and current reference values are illustrated with a *.

As illustrated in FIG. 7, $\omega^*$ represents the reference angular motor speed to reach using the speed loop regulation, which in this disclosure is set to zero. The speed loop comprises in this example in a first stage inputting a difference between $\omega^*$ and a feedback angular motor speed $\omega$ in a proportional-integral controller (PID) of gain factor $K_p$ and integral gain $K_i$, whereby s represents the Laplace parameter. The following stage comprises assigning $i_d^*$ and $i_q^*$ reference values in function of the fixed non-zero stator current magnitude $I_S$ and of gain $K_\gamma=-3/2\, n_p L_\Delta I_S$ which is applied to match the speed controller output with the current phase angle. In a further stage, the PMSM is controlled by assigning corresponding direct and quadrature voltages $v_d$ and $v_q$ at the PMSM stator to generate feedback speed $\omega$. As explained above, it is important to note that such a control loop permits obtaining the permanent magnet flux state at standstill and while avoiding reaching excessive stator current values.

In other examples, such control loop may rely on value tables stored for example in storage 602, or on different relations relying on the same or equivalent physical principles.

The invention claimed is:

1. A method for determining a permanent magnet flux state of a rotor in a synchronous motor using a variable speed drive, VSD, the method comprising:

obtaining, at the VSD, d-axis and q-axis inductance values of the motor;

fixing, by the VSD, a non-zero stator current magnitude;

controlling, by the VSD, a motor speed of the motor using a speed loop regulation in a stator current angle $\gamma$, polar coordinate frame to reach a zero motor speed steady state corresponding to the fixed non-zero stator current magnitude, to the obtained d-axis and q-axis inductance values, and to a no-load situation, wherein controlling the motor speed comprises maintaining the fixed non-zero stator current magnitude constant while adjusting the stator current angle until the zero motor speed steady state is reached; and recording, at the VSD, coordinates of the reached steady state, wherein the coordinates comprise a value of the stator current angle corresponding to the zero motor speed steady state.

2. The method according to claim 1, wherein the coordinates correspond to $\gamma=0°$, wherein the method comprises communicating, by the VSD, that the flux state corresponds to a low saliency state.

3. The method according to claim 1, wherein the coordinates correspond to $\gamma=90°$, wherein the method comprises communicating, by the VSD, that the flux state corresponds either to a demagnetized or to a zero flux state.

4. The method according to claim 1, wherein the coordinates correspond to a value of $\gamma$ comprised in an interval of −180° to −90°, −90° to 0°, 0° to 90° or 90° to 180°, wherein the method comprises communicating, by the VSD, a permanent magnet flux value estimate.

5. The method according to claim 4, the method comprising operating the motor with the VSD taking the permanent magnet flux value estimate into account.

6. The method according to claim 4, the method comprising:

detecting, at the VSD, a difference between the permanent magnet flux value estimate and a reference value, wherein the difference is consistent with a rotor flux reduction exceeding a predetermined drift threshold; and in response to the detecting, limiting, by the VSD, one or more of a motor speed or motor load in order to reduce an operating temperature.

7. The method according to claim 1, wherein the method comprises receiving, at the VSD, motor position sensor data from one or more sensors, the one or more sensors comprising one or more of a hall sensor and of an optical encoder sensor.

8. The method according to claim 1, the method comprising transmitting, by the VSD, permanent magnet flux state information over a network.

9. A non-transitory computer-readable storage medium comprising instructions which, when executed by a processor, cause the processor to carry out the method of claim 1.

10. A variable speed drive, VSD, of a synchronous motor comprising a permanent magnet rotor, the variable speed drive comprising a processor and a memory, the processor being configured to operate according to the method of claim 1.

11. The VSD according to claim 10, configured to operate the synchronous motor in a standstill mode.

12. The VSD according to claim 11, configured to operate the motor decoupled from a load.

13. The VSD according to claim 10, wherein the VSD comprises a networking module to communicate a permanent magnet flux state in function of the recorded coordinates of the reached steady state.

14. The VSD according to claim 13, wherein the communication of the permanent magnet flux state is in function of the value of the stator current angle, $\gamma$, polar coordinate frame corresponding to the reached steady state.

15. A server comprising a processor, a networking module and a memory, wherein the server is connected via a network to a plurality of variable speed drives configured to operate according to claim 8, wherein the processor of the server is to compile permanent magnet flux states received from the variable speed drives of the plurality of variable speed drives.

16. A system for determining a permanent magnet flux state of a rotor in a synchronous motor, the system comprising:

a variable speed drive (VSD) configured to:

obtain d-axis and q-axis inductance values of the motor;

fix a non-zero stator current magnitude;

control a motor speed of the motor using a speed loop regulation in a stator current angle $\gamma$, polar coordinate frame to reach a zero motor speed steady state corresponding to the fixed non-zero stator current magnitude, to the obtained d-axis and q-axis inductance values, and to a no-load situation, wherein controlling the motor speed comprises maintaining the fixed non-zero stator current magnitude constant while adjusting the stator current angle until the zero motor speed steady state is reached; and record coordinates of the reached steady state, wherein the coordinates comprise a value of the stator current angle corresponding to the zero motor speed steady state.

17. The system according to claim 16, wherein the VSD is further configured to:

determine that the value of the stator current angle corresponds to $\gamma=0°$; and communicate that the flux state corresponds to a low saliency state.

18. The system according to claim 16, wherein the VSD is further configured to:

determine that the value of the stator current angle corresponds to a value of $\gamma$ comprised in an interval of −180° to −90°, −90° to 0°, 0° to 90° or 90° to 180°;

calculate a permanent magnet flux value estimate based on the value of the stator current angle; and communicate the permanent magnet flux value estimate.

19. The system according to claim 18, wherein the VSD is configured to calculate the permanent magnet flux value estimate according to the equation $\varphi r=L\Delta IS\sin\gamma$, where $L\Delta=Ld-Lq$, IS is the fixed non-zero stator current magnitude, and $\gamma$ is the value of the stator current angle corresponding to the zero motor speed steady state.

20. The system according to claim 16, wherein the VSD is configured to operate the synchronous motor in a standstill mode with the motor decoupled from a load.

* * * * *